(No Model.)
G. B. BRYANT.
COMBINED SUPPORTING BRACKET FOR UNDERGROUND TRACTION RAILWAYS AND ELECTRICAL WIRE CONDUITS.
No. 318,951. Patented June 2, 1885.
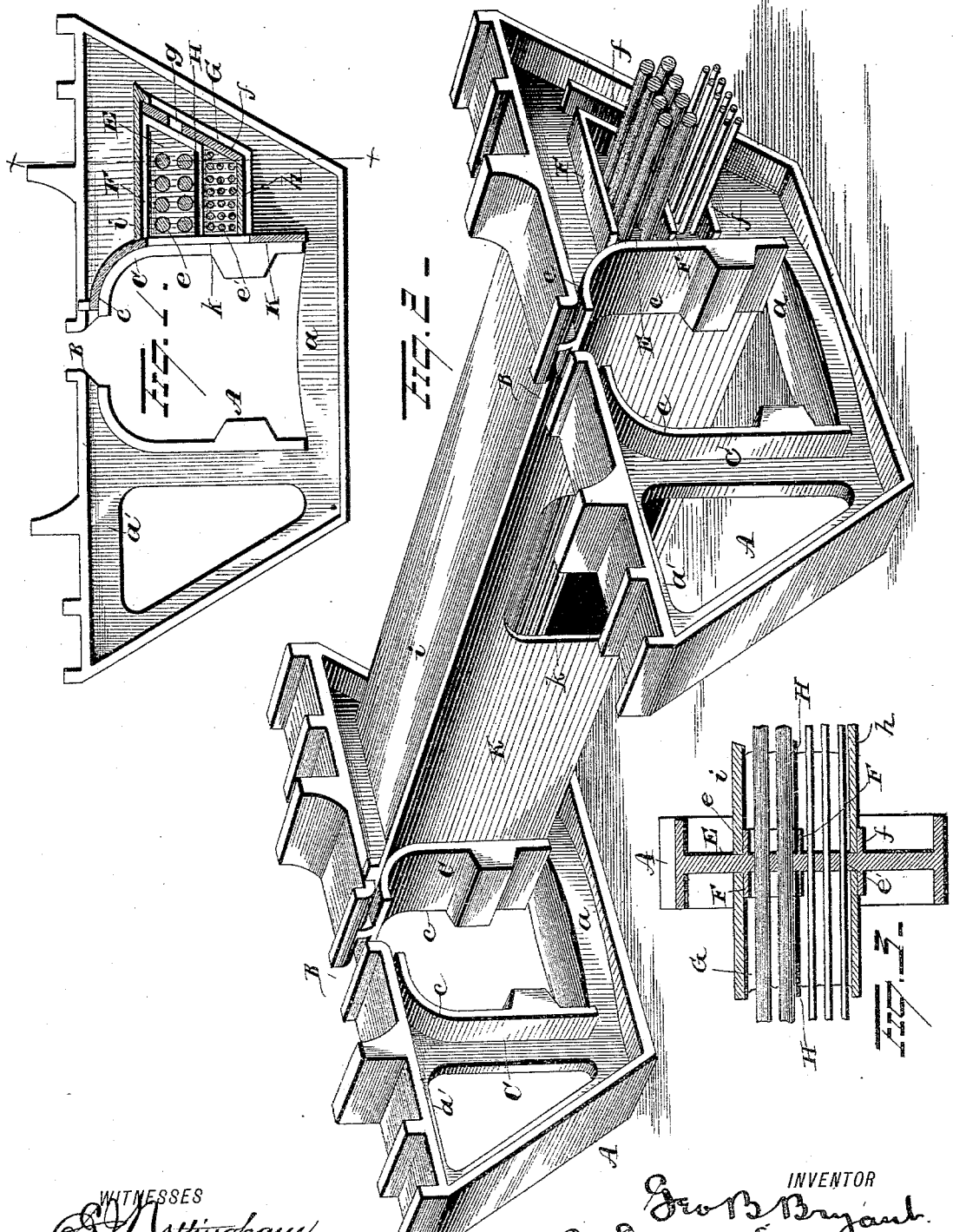

UNITED STATES PATENT OFFICE.

GEORGE B. BRYANT, OF PHILADELPHIA, PENNSYLVANIA, ASSIGNOR OF ONE-HALF TO EDWARD D. DOUGHERTY, OF SAME PLACE.

COMBINED SUPPORTING-BRACKET FOR UNDERGROUND TRACTION-RAILWAYS AND ELECTRICAL-WIRE CONDUITS.

SPECIFICATION forming part of Letters Patent No. 318,951, dated June 2, 1885.

Application filed January 3, 1885. (No model.)

*To all whom it may concern:*

Be it known that I, GEORGE B. BRYANT, of Philadelphia, in the county of Philadelphia and State of Pennsylvania, have invented certain new and useful Improvements in Supporting-Brackets for Traction Underground Railways; and I do hereby declare the following to be a full, clear, and exact description of the invention, such as will enable others skilled in the art to which it appertains to make and use the same.

My invention relates to an improvement in combined supporting - brackets for underground traction-railways and electrical-wire conduits, the object of the same being to provide, in connection with the supporting-bracket, means for supporting, separating, and housing systems of electric wires for the telegraph, telephone, and electric light, or any one or more of said systems, a further object being to provide a box or conduit for said systems which shall be at all times accessible from the cable-conduit, a further object being to provide a support of the above-named character in which the section devoted to the support of the wires and conduit shall at the same time serve to materially strengthen the supporting - bracket itself; and with these ends in view my invention consists in certain features of construction and combinations of parts, as will be hereinafter described, and pointed out in the claims.

In the accompanying drawings, Figure 1 is a side elevation of the bracket. Fig. 2 is a view in perspective of two successive brackets, showing the electric - wire conduit and means for access thereto; and Fig. 3 is a cross-section of the electric-wire conduit and wires on *x x*.

A represents the supporting-bracket, consisting of a single casting, having a flaring shape from the base upward, like the ends of the letter W. The base is re-enforced by a heavy strengthening-rib, *a*, and the ends and top by a strengthening-rib, *a'*, of less size than *a*, the same being curved at the angles of the bracket, and thereby affording a strong resistance against any tendency the bracket may have to spring. The top of the bracket is provided with an open slot, B, at the center for the passage of the grip, and on each side of the slot B the top is connected with the base by the curved standards C, the latter being provided with flanges *c*, for the attachment of the sides of the cable-conduit D.

The space between the standards C and the ends of the bracket which has hitherto been left vacant for the purpose of saving metal and rendering the bracket less expensive is here filled on one side by a web of metal, E, cast integral with the bracket and on one side thereof. Through the web E series of perforations *e e'*, &c., of different sizes, are formed, to accommodate wires for electric lights, telephones, and telegraphs, as may be found desirable. It is important that the wires for electric light should be separated from those for telephone and telegraph purposes by some insulating material, and for this purpose I preferably construct the systems of perforations as shown, in which the large perforations *e* are for groups of telephone or telegraph wires, and the smaller perforations are for electric-light wires.

Laterally - extending flanges F and *f* are formed integral with the web E and extend partially about each set of perforations, forming seats for the attachment of the sides of the electric-wire conduit, and for the support of the insulating or separating partition between the electric-light and the telegraph wires.

G represents the outside section of the electric-wire conduit, and is provided at suitable intervals with perforations *g*, through which branch wires may lead to a house on the side of the road. H is the insulating partition, the ends of which rest on the portion of the flange F between the sets of perforations *e* and *e'*. *h* is the bottom section of the conduit, and *i* the cover.

The inside section K of the electric-wire conduit is formed by the side of the cable-conduit, and is provided with man-holes *k* at suitable intervals, and of suitable size and shape to admit the arms or body of a man, as may be found expedient, for overhauling the wires, attaching branch wires, &c.

The advantages of the above construction are obvious, but among others may be mentioned the following: There is no necessity for digging up the street to repair or lay new wires or make connections with wires, the whole being accomplished through the agency of the cable-conduit from which the wire-conduit is accessible. Again, the wires may be designated by figures or letters arranged about the perforations on the web E, and thereby expedite the attachment of branch wires and obviate the liability to make mistakes, and, while the supporting-bracket is made somewhat more expensive by the formation of the web, the extra expense is more than compensated for in the slight initial cost of the wire-supports, in the durability of the wire-conduit, which is free from exposure to moisture, and hence slow to rust, and in the additional strength which the bracket-support receives therefrom.

It is evident that slight changes may be made in the form and arrangement of the parts described without departing from the spirit and scope of my invention—as, for example, the grouping of the perforations may be in different form, and the flanges about said groups of different shape, admitting of modified forms of wire-conduit sides and cover; hence I do not wish to be understood as limiting myself strictly to the construction herein set forth; but, Having fully described my invention, what I claim as new, and desire to secure by Letters Patent, is—

1. The combination, with a supporting-bracket for cable railways, of electric-wire supports formed integral therewith, and means for attaching an electric-wire conduit thereto, substantially as set forth.

2. The combination, with a supporting-bracket for cable railways, of a perforated web formed integral therewith for supporting a system of electric wires, substantially as set forth.

3. The combination, with a supporting-bracket for cable railways, of a perforated web provided with flanges for supporting electric wires and the conduit inclosing the wires, substantially as set forth.

4. The combination, with cable-railway supporting-brackets, of an electric-wire conduit supported by said brackets, said conduit being accessible from the cable-conduit, substantially as set forth.

5. The combination, with cable-railway supporting-brackets, of electric-wire conduits composed of sections extending between each two successive brackets, said conduits being accessible from the cable-conduit, substantially as set forth.

6. The combination, with cable-railway supporting-brackets, of electric-wire conduits supported by said brackets, the walls of said wire conduit being perforated for the attachment of branch wires and for access from the cable-conduit, substantially as set forth.

7. The combination, with a cable-railway supporting-bracket, of a web formed integral with the bracket, the web being perforated in groups for the passage of different wires, and the groups separated by projections for securing a partition-wall, substantially as set forth.

In testimony whereof I have signed this specification in the presence of two subscribing witnesses.

GEORGE B. BRYANT.

Witnesses:
W. H. RUFF,
E. C. SEWARD.